United States Patent
Brown et al.

(10) Patent No.: US 6,197,403 B1
(45) Date of Patent: Mar. 6, 2001

(54) INTEGRAL SOUND ABSORBER AND WATER DEFLECTOR DOOR PANEL

(75) Inventors: Steven G. Brown, Bloomfield Township; Guy W. Boitos, Troy, both of MI (US)

(73) Assignee: HP Pelzer (Automotive Systems), Inc., Troy, MI (US)

( * ) Notice: Subject to any disclaimer, the term of this patent is extended or adjusted under 35 U.S.C. 154(b) by 0 days.

(21) Appl. No.: 09/055,521

(22) Filed: Apr. 6, 1998

(51) Int. Cl.[7] ................................................. B60R 13/02
(52) U.S. Cl. .................. 428/137; 428/318.4; 428/319.3; 428/319.7; 428/319.9; 428/156; 428/192; 428/213; 428/136; 296/39.1; 296/39.3
(58) Field of Search ................................ 428/137, 318.4, 428/319.3, 319.7, 319.9, 156, 192, 213, 136; 296/39.1, 39.3

(56) References Cited

U.S. PATENT DOCUMENTS

| | | | |
|---|---|---|---|
| 2,124,463 | 7/1938 | Cunnington | 49/502 |
| 4,432,580 * | 2/1984 | Lohmar et al. | 181/290 |
| 4,469,732 | 9/1984 | Isaksen et al. | 296/39.1 |
| 4,588,627 | 5/1986 | Isaksen et al. | 428/80 |
| 5,322,722 | 6/1994 | Rozenberg | 428/40 |
| 5,345,720 | 9/1994 | Illbruck et al. | 49/502 |
| 5,456,513 | 10/1995 | Schmidt | 296/39.1 |
| 5,482,343 | 1/1996 | Bradac | 296/39.1 |
| 5,560,967 | 10/1996 | Isaksen | 428/71 |
| 5,595,415 | 1/1997 | Beaulat | 296/39.1 |
| 5,688,015 | 11/1997 | Patterson et al. | 296/154 |

* cited by examiner

Primary Examiner—William P. Watkins, III
(74) Attorney, Agent, or Firm—Young & Basile, P.C.

(57) ABSTRACT

An integral sound absorber and water deflector door panel positionable in space defined between an inner wall and a passenger compartment door panel of an automobile vehicle door assembly. The integral panel is composed of a first polymeric layer made of a water impervious polymeric film having an essentially constant thickness. The first polymeric layer has a first face adapted to contact the interiorly oriented face on the inner wall of the vehicle door assembly and remain in overlying parallel orientation thereto. A second polymeric layer is composed of a polymeric foam integrally connected to the second face of the first polymeric layer in continuous overlying relationship thereto. The second polymeric layer has an outer face opposed to the first polymeric layer which, preferably, has at least one region adapted to directly contact a portion of the exteriorly oriented face of the passenger compartment door panel. The thickness of the first polymeric layer of the integral door panel is essentially uniform throughout the part while the thickness of the second polymeric layer varies positionally to conform the dimensional requirements of the surrounding door assembly and particular vibrational and noise abatement requirements of the given door assembly and the associated automotive vehicle.

39 Claims, 2 Drawing Sheets

INTEGRAL SOUND ABSORBER AND WATER DEFLECTOR DOOR PANEL

FIELD OF THE INVENTION

The present invention relates to devices for acoustic insulation or sound absorption which can also function as a moisture barrier and can be arranged within a hollow space created by an outer wall and an inner wall of the door of a motor vehicle.

BRIEF DESCRIPTION OF RELEVANT ART

Automotive vehicle doors generally comprise a pair of metal panels which form an exterior skin joined to a panel forming an inner wall along the respective panel edges. Together, the exterior panel and inner wall form a cavity within which the door window may be lowered. This cavity may also contain window regulating equipment, door locks, sound speakers and the like. The inner wall is covered with a rigid or semi-rigid trim panel formed of cloth-like or plastic trim material which serves as the passenger compartment door panel.

In such door constructions, water may enter the door cavity through the opening through which the door window slides. Holes are generally formed at the bottom of the door cavity for draining the water. However, when water enters the door cavity, the water may run down along the inner panel towards the drain holes but may seep into and through the trim panel unless something is done to deflect it. In order to protect the passenger door compartment panel, it is common to position a panel liner formed of a treated paper or thin plastic film over the interior surface of the door beneath the passenger compartment door panel. The panel liner functions to deflect the water entering the cavity so that the water runs down the liner to the bottom of the door without contacting the trim panel.

Various water shields or deflector panel designs have been proposed which are positioned in the vehicle door assembly to deflect water or prevent any water entering the door cavity from seeping through the passenger door compartment panel into the vehicle interior. The use of laminated layers of thin, film-like plastic sheets adhered on either side of a central layer formed of a thicker foamed plastic sheet is taught in references such as U.S. Pat. No. 5,456,513 to Schmidt. The Schmidt reference is directed to an essentially flat panel which has a speaker compartment and other recesses specifically molded in the body panel. The filled foamed plastic sheet and overlying plastic sheets are of essentially constant thickness. The panel is produced by coextrusion of filled plastic resin with the surrounding unfilled layers. The resulting laminate is mold formed to shape.

Water deflection and insulation panels constructed from a thin-wall composite lining are also discussed in Beaulat, U.S. Pat. No. 5,595,415. In Beaulat, a composite door lining has an inner water deflecting panel and a twin panel which acts in concert with the inner panel to define cavities in which an optional polymeric foam may be selectively applied. The optional polymeric foam can provide selective sound proofing characteristics. Like Schmidt, the panel taught in Beaulat is directed to liners in which the polymeric foam layer is encapsulated between two film layers. In Beaulat, the construction necessitates separate forming steps for each outer layer. Filling cavities with foam material occurs after the two outer layers have been molded.

Additional sound absorbing water deflectors have been proposed. Typically, these sound absorbing automotive water deflectors are composed of polymeric foam material which is interposed between layers of a polymeric film. Examples of these include U.S. Pat. No. 5,560,967 to Isaksen and U.S. Pat. No. 5,345,720 to Illbruck. In Isaksen '967, the urethane foam is interposed between two layers of high strength low density polyethylene film. Local regions of the deflector panel have mechanically produced pockets in which the polyethylene surface sheets are stretched and the corresponding urethane foam material ruptured. In Illbruck, a thin wall, profiled insulation part which amounts to ¹⁄₁₀ to ¹⁄₂₀ of the corresponding perpendicular distance between the door panels can consist of closed-cell foam such as polyethylene, backed by a corresponding layer of open-cell foam. Partial cavities formed in the part can be filled with polyurethane foam as required for sound insulation.

Various patents have addressed problems relating to fastening the insulation part in position in the door assembly. U.S. Pat. No. 4,588,627 to Isaksen is directed to the use of a suitable adhesive surrounding the outer flange of the deflector. U.S. Pat. No. 5,322,722 to Rozenberg teaches the use of an adhesive system positioned in a deflectable bead.

Specific modifications and improvements to eliminate paths permitting the ingress of water have also been pursued. U.S. Pat. No. 5,482,343 to Bradac is directed to a mechanism for permitting mounting of the water deflector in a manner which prevents the ingress of water at a mounting clips. U.S. Pat. No. 5,688,015 to Patterson is directed to a water seal liner having water deflector orifices.

The panel devices mentioned have various shortcomings. Laminate panels having dual layers of thin polymeric film with a layer of polymeric foam sandwiched between are generally of constant thickness. Such constructions make it difficult to provide an integrally formed unit with variations in layer thickness. Such panels are also susceptible to delamination and tearing during assembly and use.

Thus, it is desirable to provide an integral sound absorber and water deflector door panel with sound insulation and absorption capabilities which are improved over those already known in the art. It is also desirable that the device be easy to install during the vehicle assembly process. It is desirable that the resulting panel have layers which operate cooperatively to provide a sound barrier device which acts to absorb and/or dampen exterior sounds and road noise. It is also desirable to provide an integral sound absorber and water deflector door panel having a variable thickness at specified locations and that this variation in thickness be due to variations in thickness of the second layer.

It is also desirable to provide a process for producing an integral sound absorber and water deflector door panel which is vacuum formable to a contoured shape which conforms to the specific shape of the vehicle door in which it is to be assembled. It is also desirable to provide a process which produces an integral door panel which readily accommodates specific mechanical electrical and fastening components of the vehicle door.

Finally, it is desirable to provide an integral sound absorber and water deflector door panel which is relatively inexpensive to manufacture and install, increases installation ease and efficiency and is rugged and durable through the assembly process and vehicle life.

SUMMARY OF THE INVENTION

The present invention is directed to an integral sound absorber and water deflector door panel which is positionable in space defined between an inner wall and a passenger compartment door panel of an automobile vehicle door assembly. The device of the present invention is composed of a first polymeric layer made of a water impervious polymeric film having an essentially constant thickness. The first polymeric layer has a first face adapted to contact the interiorly oriented face on the inner wall of the vehicle door assembly and remain in overlying parallel orientation thereto. The integral door panel of the present invention also has a second polymeric layer composed of a polymeric foam integrally connected to the second face of the first polymeric layer in continuous overlying relationship thereto. The second polymeric layer has an outer face opposed to the first polymeric layer. The outer face of the second polymeric layer preferably has at least one region which is adapted to directly contact at least a portion of the exteriorly oriented face of the passenger compartment door panel. At least one contour may be defined in the first face of the first polymeric layer. The integral door panel of the present invention has at least one region in which the total thickness of the panel is essentially equal to the width of the space defined between the inner wall and the passenger compartment door panel.

The thickness of the first polymeric layer of the integral door panel remains essentially constant throughout the panel while the thickness of the second polymeric layer varies positionally to conform the dimensional requirements of the surrounding door assembly and to meet particular vibrational and noise abatement requirements of the given door assembly and the associated automotive vehicle. In the integral door panel of the present invention, the first and second layers act cooperatively to accomplish sound absorption.

DESCRIPTION OF THE DRAWING

Various objects and advantages will become apparent from the following description when read in conjunction with the accompanying drawing in which like reference numerals are used throughout in referring to the various elements and wherein.

DESCRIPTION OF THE PREFERRED EMBODIMENT

Figure 1:
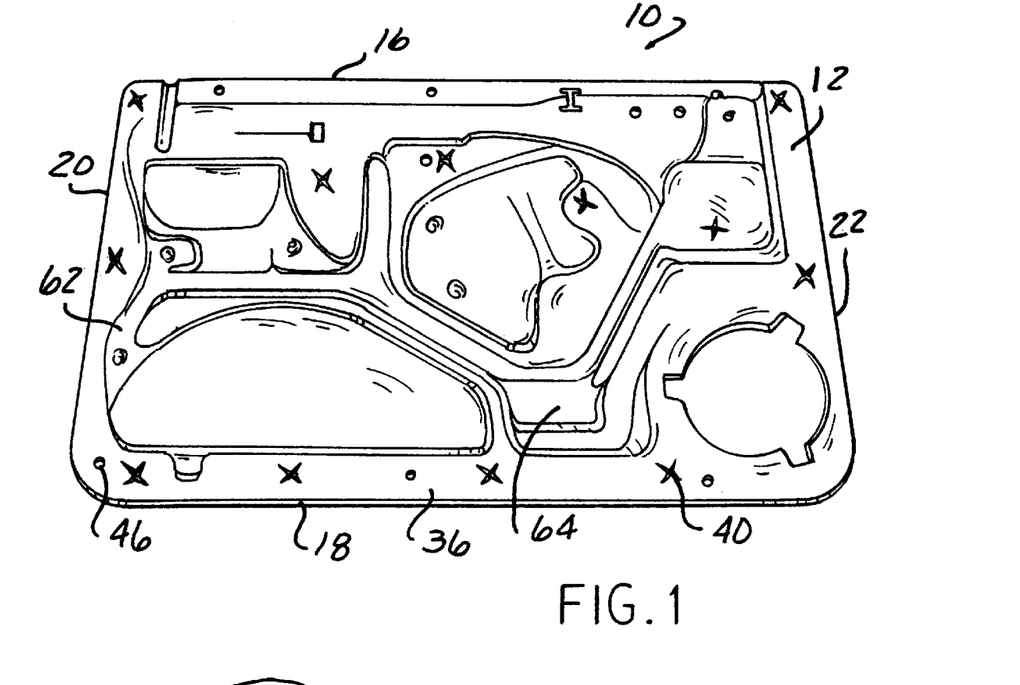
FIG. 1 is a view of the outer oriented surface of the integral sound absorber and water deflector door panel of the present invention showing the outer face of the first polymeric layer.
Figure 4:
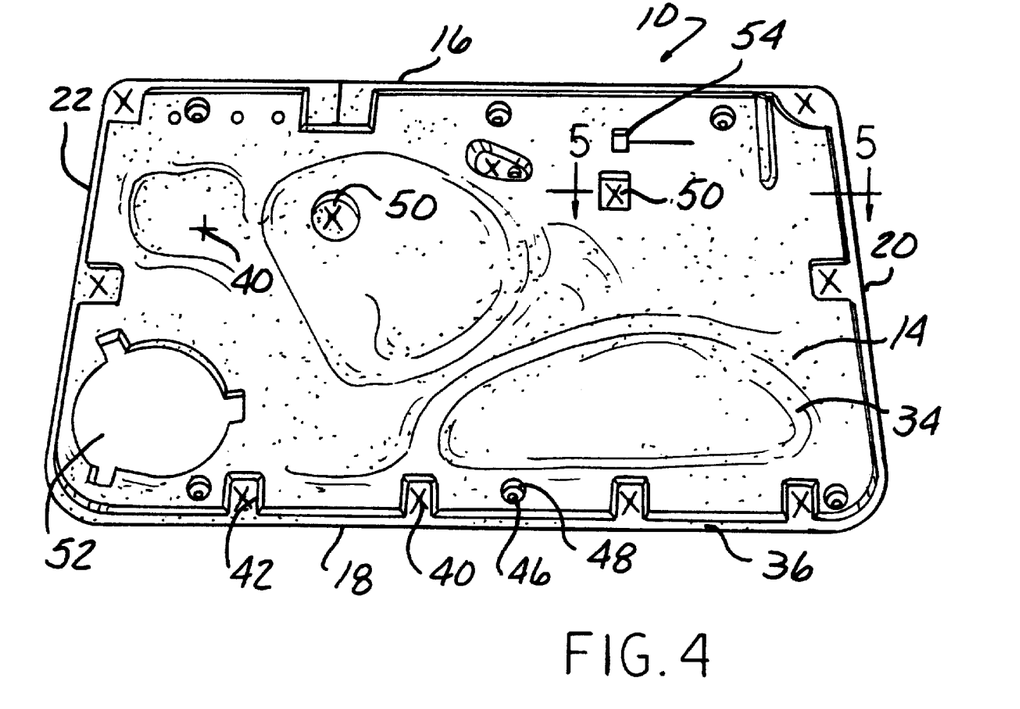
FIG. 4 is a view of the inwardly oriented face of the integral door panel of FIG. 1 exposing the second polymeric layer.

Referring more particularly to the drawings wherein the showings are for purposes of illustrating the preferred embodiment of the invention only and not for purpose of limiting the same, the obverse and reverse sides 12, 14 of the integral sound absorber and water deflector door panel 10 of the present invention are shown in FIGS. 1 and 4 respectively. The integral door panel 10 is particularly intended for use in a vehicle door assembly to prevent ingress of water into the passenger compartment, thereby protecting the associated passenger door compartment panel from damage while simultaneously preventing transmission of noises into the passenger compartment. In its assembled state within the associated vehicle door assembly, the obverse side 12 is exteriorly facing and directed toward the inner panel of the vehicle door assembly while the reverse side 14 is intended to face inward toward the passenger compartment of the associated vehicle and is directed toward the exteriorly oriented surface of the passenger compartment panel of the vehicle door assembly.

It is to be understood that the specific configuration of the integral sound absorber and water deflector door panel 10 of the present invention as depicted in the drawing figures is considered illustrative of the present invention. The number and specific location of contours, beads, slits, apertures and detents on the panel body can vary. It is intended that the specific shape and profile of the integral panel 10 of the present invention will vary given specific design requirements of various vehicles. The outer peripheral shape of the integral panel 10 of the present invention is such that it overlies and covers those portions of the inner door panel through which water may gain entry. Thus, it is intended that the peripheral shape of the integral panel 10 of the present invention can vary significantly as can any interior contours and geometry.

Generally, the integral panel 10 comprises a window opening edge portion 16, a lower edge portion 18 opposed to the window edge portion 16 and perpendicular lateral edges 20 and 22. Various openings for the passage of wires, fasteners, and the like are also formed through the integral door panel 10 and will be discussed in greater detail subsequently. The window opening edge 16 is so designated as being the edge portion of the integral panel 10 which will be positioned proximate to the window opening of the door assembly (not shown) with the other edges 18, 20, 22 oriented accordingly.

The integral panel 10 of the present invention is a multi-layer polymeric composite having a first polymeric layer 26 composed of a water impervious polymeric film and an integrally connected second polymeric layer 28. As shown best in FIG. 5, the first polymeric layer 26 has a outwardly oriented face 30 which is adapted to contact the inwardly oriented face of the inner wall of an automobile vehicle door with which it is assembled. Preferably, at least a portion of the outer face 30 of this polymeric layer 26 is in contacting parallel orientation to the inner wall of the vehicle door when assembled.

The first polymeric layer 26 has a substantially constant thickness throughout the body of the integral panel 10. The polymeric layer 26 is a relatively thin, flexible sheet of a suitable plastic material selected from the group consisting of ethylene vinyl acetate, polyester, polyurethane, polyvinylchloride, various polyolefins, such as polyethylene and polypropylene, and mixtures thereof; with polyurethane being preferred. It is to be understood that other plastic film materials having the desired characteristics may be substituted for the polymeric materials enumerated. The plastic material employed is generally one which can be extruded as a continuous film and is appropriately deformable upon exposure to elevated temperature such as would occur as in vacuum form molding processes. The thickness of the first polymeric sheet 26 is sufficient to provide a water impervious outer layer to the integral panel 10 while enabling the panel 10 to retain characteristics such as flexibility and light weight. In the integral panel 10 of the present invention, the first polymeric layer 26 has a thickness in a range between about 2 and 100 mils with a thickness between about 5 and about 10 mils being preferred.

The second polymeric layer 28 is integrally connected to the first polymeric layer 26 in a continuous overlying relationship. The second polymeric layer is made of a polymeric foam material which can be composed of any foamable polymeric material such as those selected from the group consisting of polyethylene, polyvinyl chloride, polyurethane and mixtures thereof; with polyurethane foam being preferred. The polymeric foam employed, preferably, has a density between about 30 kg/m$^3$ and about 210 kg/m$^3$. The polymeric foam suitable for use in the present invention is resistant to separation, tearing and degradation through the desired vehicle lifetime. Additionally, the polymeric foam material is, preferably made, with low friability material having sufficient flexibility to bend and contour without tearing, ripping and the like. The polymeric foam chosen will be one which when employed in the panel 10 of the present invention, will function to reduce the level of exterior noise which enters the passenger compartment of the vehicle. The polymeric foam chosen permits the integral panel 10 to function as an efficient sound barrier by absorbing sound and dampening the amplitude of sound waves entering the compartment either selectively or generally.

The thickness of the second polymeric layer 28 varies depending upon the positional location on the integral panel 10. Generally, the thickness of the second polymeric layer 28 of the integral panel ranges from a thickness essentially equal to the thickness of the first polymeric layer 26 to a thickness about 300 times greater than that of the first polymeric layer 26. Preferably, the thickness of the second polymeric layer 28 varies between about 0.02 and about 5 inches in the typical integral panel 10.

The second polymeric layer 28 is, preferably, in direct integral adhering contact with the first polymeric layer 26. By "integral contact" it is meant that the respective layers 26 and 28, when connected, form a unitary body in which the respective layers resist delamination and separation throughout the lifetime of the vehicle in which the integral part 10 is assembled. Minor amounts of localized separation or wrinkling can be tolerated provided the two respective layers remain sufficiently connected to one another to perform the desired insulating and water deflecting functions. Without being bound to any theory, it is believed that the two layers act cooperatively to enhance the sound absorbing capacity of the panel 10 over that which would have been expected for the individual layers taken separately.

It is within the purview of this invention to interpose any suitable optional intermediate layers between the first polymeric layer 26 and the second polymeric layer 28 to enhance adhesion between the respective layers 26, 28, etc. However, in the preferred embodiment, the first polymeric layer 26 and the second polymeric layer 28 are in direct contact with one another. It is within the purview of this invention that the first polymeric layer 26 may be optionally overlain with compatible layers or coating material (not shown) as desired. The opposed foam surface 32 of the second polymeric layer remains exposed and is adapted to directly contact at least a portion of the exteriorly oriented face of the passenger compartment door panel (not shown).

The integral panel 10 of the present invention has at least one geometric contour 34 defined in the face of the first polymeric layer 26. The integral panel 10 of the present invention may also include at least one region having a total body thickness essentially equal to the width of the space defined between the inner walls and the passenger compartment door panel of the associated automobile vehicle door assembly. Because the polymeric foam material is resiliently compressive, the integral panel 10 of the present invention can be compressively maintained between the passenger compartment door panel and the inner wall of the automobile vehicle door assembly. Where desired, the integral panel 10 can be configured to completely fill the void defined by the inner wall and passenger compartment door panel of the automotive vehicle door in a manner which provides an exteriorly oriented water barrier layer in face to face relationship to the inner door panel and a foam region in contact with the passenger compartment door panel. This can advantageously accomplish sound absorption and insulation as well as preventing drafts, whistles and the like from occurring as the automobile is driven at speed.

Figure 5:
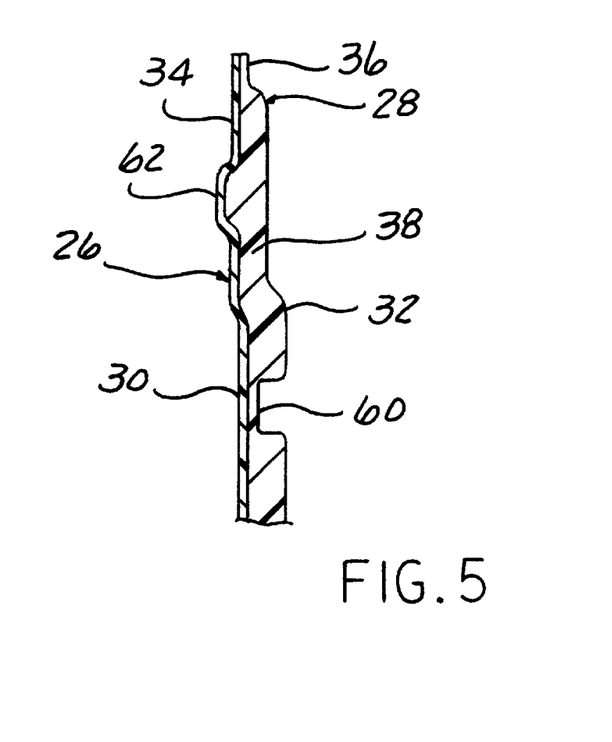
FIG. 5 is a partial cross sectional view of the integral door panel of the present invention taken along the line 5—5 shown in FIG. 2.

The integral panel 10 of the present invention may be configured to include elements which can provide structural strength and assist in positioning of the panel 10 and its assembly into the vehicle door unit as well as providing sound absorption and water deflection. Thus, the integral panel 10 may include flange 36. As shown in FIGS. 1 and 4, flange 36 can extend contiguously inward from any or all sides of the integral panel 10 such as from vehicle window opening edge portion 16, lower edge portion 18 and lateral edges 20 and 22. The flange 36 generally matches the corresponding peripheral configuration of the associated passenger compartment door panel. As best seen in FIG. 5, the peripheral flange 36 extends laterally outward from the central body region 38 of the integral panel 10 and, like the central body region 38, is continuously formed of the first polymeric layer 26 and the second polymeric layer 28. In the peripheral flange 36, the first polymeric layer 26 has a constant thickness essentially equal to the thickness of the first polymeric layer 26 in the central body region 38; i.e. between about 1 mil and 100 mils, with thicknesses between about 2 mil and about 10 mil being preferred. The second polymeric layer 28 in the flange 36 generally has a thickness between about 1 and about 50 times the thickness of the first polymeric layer 20. Preferably, the second polymeric layer 28 in the flange region has a thickness between about 2 and about 25 times the thickness of the first polymeric layer.

The peripheral flange 36 of the integral panel 10 of the present invention may include a plurality of openings such as cross slits 40 to accommodate fasteners and the like. The exact position of openings such as cross slits 40 will vary depending upon the particular door assembly in which the integral panel 10 is to be installed. It is within the purview of this invention that openings such as cross slits 40 can be positioned in preformed inlets 42 in the central body portion 38 formed in the second polymeric layer 28 contiguous with the peripheral flange 36. Other openings such as apertures (not shown) may also be formed in the peripheral flange 36 as required.

The integral panel 10 of the present invention can further include the various spaced-apart openings 46 positioned in the central body portion 38 of the integral panel 10 to accommodate fasteners or the like to secure the passenger compartment door panel in place. Such openings 46 can also permit door component hardware to transect the integral panel 10 in a water deflecting manner. As depicted in FIG. 1 and, more particularly in FIG. 4, these spaced-apart openings 46 can be positioned in suitable detents 48 formed in the second polymeric layer 28. The thickness of the second layer 28 at the base of a detent 48 is generally between about 1 and about 50 times the thickness of the first polymeric layer; with a range between about 2 and about 50 times the thickness of the first polymeric layer being preferred.

The integral panel 10 of the present invention can include openings in the central body 38 to accommodate additional fastener hardware or to permit door component hardware to laterally transect the integral panel 10. Openings such as cross slits 40 are particularly adapted for accommodating hardware associated with window opening mechanisms, door locks and the like. As depicted in FIG. 1, and, more particularly in FIG. 4, these cross slits 40 may be positioned in detents 50 formed in the second polymeric layer 28 in which case the thickness of the second polymeric layer 28 in the formed detent is less than the thickness in the surrounding region with thicknesses between about 1 and about 50 times the thickness of the first polymer layer being possible and second layer thicknesses between about 2 and 25 times the thickness of the first polymeric layer 26 being preferred. Cross slit 40 can also be located in non-detent regions as further illustrated in FIG. 4.

Other openings such as opening 52 may be positioned in the integral panel 10 to accommodate other automotive door components such as speakers, duct work, lock regulators or the like. The respective openings such as opening 52 can be die cut to the desired configuration to accommodate the speaker or the like. Similarly, openings can include various slits, cuts or the like to facilitate assembly such as opening 54.

In the past it has been taught that inner corners of die cut openings such as cross slits 40 and openings 50 and 54 as well as intersections of such edges of the openings 50 and 54 should be smoothly curved to avoid high stress concentrations which might otherwise result in undesired tearing of the thinner, less robust polymeric sheets such as first polymeric layer 26. This necessitated reinforcement of stress-prone openings and the use of more complex intricately configured cutting tools to produce the desired openings. In the integral panel 10 of the present invention, the bonding interaction of the first polymeric film layer 26 and the second polymeric foam layer 28 produces a strong multilayer panel which minimizes the detrimental effect of stress concentrations at corners and sharp angles in the apertures and protects against undesirable tearing. The configuration of integral panel 10 of the present invention permits use of die cut configurations which would have been difficult in other panels. Additionally, the cross cuts and openings can have geometric configurations which can conform more closely to the component parts which will transect the insulation part in the ultimate door assembly. This enables tighter fit which, in turn, permits greater insulation and water barrier capabilities at the junction between the insulation part and the specific component part.

Figures 2, 3:
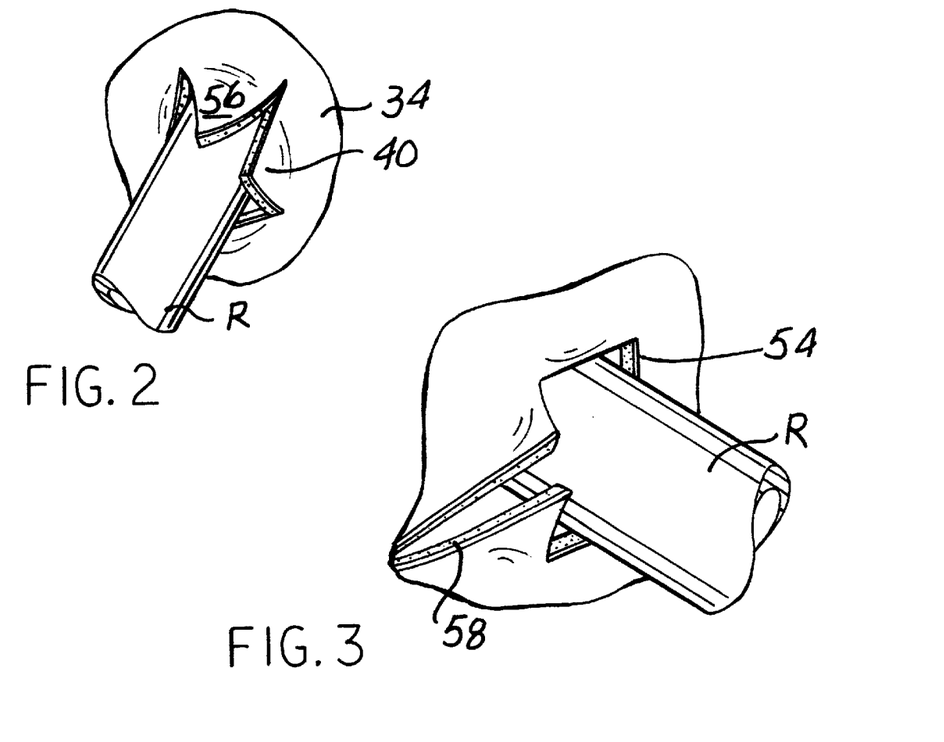
FIG. 2 is a perspective detail drawing of cross slit shown in FIG. 1 with a tubular door assembly member shown transecting it.
FIG. 3 is a perspective detail drawing of a rectangular opening in the integral door panel of FIG. 1 a tubular door assembly member shown transecting it.

This is due, in part, to the unique nature of the junction between integral panel 10 and the associated automobile door component part, two examples of which are shown in FIGS. 2 and 3. The integral panel 10 of the present invention is configured such that the opposed surface 32 of the second polymeric layer 28 is exposed in the finished panel 10 The opposed surface 32 is composed of a resilient, frictionally resistant compressible solid polymeric foam material.

In FIG. 2, rod R is shown transecting cross-slit 40. The penetration of rod R through cross-slit 50 results in an outward flaring of each petal 56 defined in cross-slit 40 such that the opposed surface 32 of second polymeric layer 28 engaging 4 contacts the surface of rod R while the outer face 30 of the first polymeric layer 26 forms a curved awning-like structure around the surface of rod R. Due to the water impervious nature of the film material of the first polymeric layer 26, the awning-like structure which is formed serves to deflect water away from the junction between rod R and integral panel 10. The resilient compressibility of the second polymeric layer 28 at and adjacent to petals 56 of cross slit 40 serves to absorb and disperse some of the stress introduced due to the deflection of the petals 56 by rod R during assembly and in the vehicle door unit as finally assembled. Additionally, the frictional resistance of the foam material of the opposed surface 32 provides ready mechanical adhesion between the rod R and integral panel 10 maintaining the deflected petals 56 in position thereon. Because of the compressible nature of the foam material of the second layer, it is also possible to configure openings with outer dimensions close to the dimensions of the particular hardware component which will transect it. It is within the purview of this invention that the panel 10 of the present invention when assembled into the vehicle door unit will have areas of localized compression in the second polymeric layer proximate to given apertures to snugly accommodate the hardware component transecting the panel.

The various openings may be positioned as required for ultimate door assembly. Thus, the openings may transverse areas of the integral panel 10 in which the second polymeric layer 28 is relatively thin such as in flange region 36 or is relatively thick such as in central body portion 38. In instances in which a door component such as a rod R transects an opening located in a relatively thick region of the second polymeric layer 28, additional compression of the foam material of second polymeric layer 28 can result in formation of a compressively sealed lip around the outer periphery of the rod R. The compressively sealed lip surrounds the outer periphery of the transecting door hardware with the water impervious first polymeric layer 26 in a manner which deflects water away from the junction between part and integral part 10.

An alternative opening 54 is shown in detail in FIG. 3 with a representative rod R transecting it as during the door assembly process. Alternative opening 54 is essentially rectangular with a die cut slit 58 extending perpendicularly outward from one edge of the opening 54. In situations in which an irregular configured handle or the like must pass through opening 54, slit 58 permits deflection of the region of the integral panel 10 proximate to the part to permit assembly. The resilient nature of the foam material of the second polymeric layer 28 permits the region proximate to the slit 58 to resume its essentially planar character after assembly in a manner which essentially seals the slit against significant water permeation.

It is also in the purview of this invention that the outwardly projecting face 32 of the second polymeric layer 28 has at least one depression 60 defined therein as shown in FIG. 5. The depression 60 is characterized by a relatively thin region of the second polymeric layer 28. The overall thickness of the second polymeric layer 28 in the depression 60 can be any thickness suitable for use with the particular door assembly. Thus, the integral panel 10 in the depression 60 can have a second polymeric layer which is as thin as that in the flange region 36 or any suitably varying thickness necessary to accommodate the finished door construction.

As best seen in FIG. 1, the integral panel 10 of the present invention may include at least one bead 62 developed on its inner wall contacting surface 30. The bead 62 projects outward from the general plane of the inner wall contacting face of the integral panel 10. As seen in FIG. 5, in the region of bead 62, the first polymeric layer 26 generally follows its contour maintaining its essentially constant thickness throughout. The second polymeric layer 28 may exhibit an analogous contour on opposed surface 32 or the layer 28 may partially or completely fill the contour defined by the first polymeric layer to meet the specific requirements of given integral panel 10. As seen from the view in FIG. 1, beads such as bead 62 define various sections of the central body 38 of the integral panel 10 which can be of different size, geometric shape and the like to provide a topography necessary to facilitate water deflecting contact between the inner wall and the outer face 30 of the integral panel 10.

In order to further facilitate water deflection and accommodate irregularities in the surface of the inner wall of the vehicle door, the integral panel 10 may further optionally include inwardly projecting contour channels 64 which project inward from the general plane of the first polymeric layer 26 again with the thickness of the first polymeric layer remaining constant throughout the inwardly projecting contour channel 64.

The passenger oriented side or obverse of the integral panel 10 may include a variety of passenger door compartment contacting regions as shown in FIG. 4. The topography of the respective obverse and reverse surfaces 30, 32 may vary in thickness and contour to accommodate unique contours in the inner wall and passenger compartment door panel. In this manner, voids created by the passenger compartment door panel can be filled with polymeric foam material integrally and continuously joined to the integral panel 10 as necessary and required.

Since the outermost face 32 is composed of a polymeric foam material having a higher coefficient of friction than the corresponding face 30 on the associated first polymeric layer 26, the large surface area of relatively high friction can be employed advantageously in maintaining the position of the integral panel 10 relative to both the inner door panel and the passenger door compartment panel as required. Additionally, the foam material of the second polymeric layer 28 can be highly compressible to permit secure contact between the integral panel 10 at and near regions transected by door components and the like. This compression capability encourages secure fit between the door panel and the various sub-components while minimizing tearing and permanent distortion of the integral panel 10 which could occur upon assembly or continued use of the automotive vehicle.

The integral panel 10 of the present invention can be advantageously formed by the process in which a polymeric film of suitable thickness, preferably polyurethane film having a thickness between about 1 and about 50 mils is placed in a suitable mold cavity and heated to a temperature below its melting point so as to enhance pliability of the film material. Formation of the material to the contours of the mold can be facilitated by any suitable procedure such as vacuum forming. Once the profile of the film material has been obtained, the mold can be closed and injected with liquid components to form the polymeric foam material which comprises the second polymeric layer. In the preferred embodiment where a two-part polyurethane foam is employed, isocyanate and polyol components of the polyurethane foam are injected into the mold cavity and allowed to foam and cure. The resulting panel removed from the mold is a two layer composite in which the polymeric film layer, the first polymeric layer 26, is integrally bonded to the polymeric foam material, the second polymeric layer 28, in a secure and essentially permanent manner with the polymeric foam material of the second polymeric layer expanding to fill any voids or contours defined in the mold chamber. Without being bound to any theory, it is believed that the reaction and curing of the polymeric foam material in contact with the polymeric film material in a partially melted state results in improved adhesion between the respective materials.

The integral panel can be made in various dimensional thicknesses and even in varying or staged thicknesses throughout the panel body. In the present invention, variations from 3 to 15 millimeters are contemplated.

Once the foam material has cured, the composite material can be removed from the mold and can be trimmed and subject to post processing procedures to introduce appropriate die cut apertures, slits and the like.

The resulting integral sound absorber and water deflector door panel 10 provides a device which can be installed without requiring extensive use of adhesive regions or strips. The panels 10 can be rapidly formed and easily shipped and stored until use. The self reinforcing nature of the panel 10 minimizes the opportunity for damage to the panel during handling and installation. Additionally, the respective outwardly facing opposed surfaces present significant differences in appearance and feel making orientation of the correct outwardly facing side easy and accurate. The compressively resilient nature of the foam material in the second polymeric layer increases sound absorption, insulation and frictional maintenance of the panel 10 in position in the door unit during assembly and use.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. An integral sound absorber and water deflector panel adapted to be positioned in a space defined between an inner wall and a passenger compartment door panel of an automobile vehicle door, the integral panel comprising:

a body member having a periphery and a central body region defined thereby, the body member comprising:
a first polymeric layer composed of a water impervious polymeric film material, said first polymeric layer having a first face adapted to contact an interiorly oriented surface of the inner wall in essentially parallel orientation thereto and an opposed second face, said first face and said second face being disposed from one another by an essentially uniform thickness of said polymeric film material;
a second polymeric layer integrally connected to said first polymeric layer in continuous overlying relationship thereto, said second polymeric layer composed of a polymeric foam material, said second layer having an outer face opposed to said first inner wall contacting face of said first polymeric layer, said outer face adapted to directly contact at least a portion of an exteriorly oriented face of the passenger compartment door panel; and
at least one contour defined in said first face of said first polymeric layer;
wherein said first polymeric layer has an essentially constant thickness, and said second polymeric layer has a positionally variable thickness over substantially the entire body member.

2. The integral panel of claim 1 wherein said first polymeric layer acts cooperatively with said second polymeric layer to minimize sound transmission through the integral panel.

3. The integral panel of claim 2 wherein said first and second polymeric layers act cooperatively to dampen sound transmitted through the panel.

4. The integral panel of claim 2 wherein at least a portion of sound is absorbed by said panel.

5. The integral panel of claim 2 wherein the space has a width, and wherein the body member further comprises at least one region having a total panel thickness adapted to be essentially equal to the width of the space defined between the inner wall and the passenger compartment door panel.

6. The integral panel of claim 3, further comprising a flange contiguously extending from said central body region along at least one edge of said integral panel, wherein said flange is composed of said first polymeric layer and said second polymeric layer, said second polymeric layer having a thickness in a range between about 1 and about 50 times said thickness of said first polymeric layer, and said second polymeric layer in said central body region has a thickness greater than said thickness in said flange region.

7. The integral panel of claim 6 wherein said thickness of said second polymeric layer in said central body region is between about 1 and about 300 times said thickness of said first polymeric layer.

8. The integral panel of claim 3 further comprising at least one cross slit extending through said first and second polymeric layers.

9. The integral panel of claim 7 wherein said thickness of said second polymeric layer proximate to said cross slit is in a range between about 1 and about 50 times said thickness of said first polymeric layer.

10. The integral panel of claim 9 wherein said cross slit is located in a depression defined in said second polymeric layer.

11. The integral panel of claim 2 further comprising:
at least one bead disposed on and projecting outward from said first face of said first polymeric layer, wherein said first polymeric layer uniformly corresponds to contours of said bead; wherein said second polymeric layer fills said contours defined by said first polymeric layer; and
at least one panel region extending between and defined by said bead.

12. The integral panel of claim 2 further comprising at least one contoured channel formed in and projecting inward from said first face of said first polymeric layer, said thickness of said first polymeric layer uniformly profiling said inwardly projecting contoured channel.

13. The integral panel of claim 12 wherein said surface of said second polymeric layer opposed to said contoured channel is essentially planar.

14. The integral panel of claim 12 further comprising at least one bead disposed in the passenger compartment door panel contacting face of said second polymeric layer.

15. The integral panel of claim 14 wherein said bead defined in said passenger compartment door panel contacting face corresponds locally with said contoured channel defined in said inner wall contacting face.

16. The integral panel of claim 3 wherein said passenger door contacting surface of said second polymeric layer has a higher co-efficient of friction relative to said inner wall contacting surface.

17. The integral panel of claim 12 wherein said first polymeric layer is composed of a polymeric film material selected from the group consisting of polyurethane, polyvinyl chloride, polyethylene and mixtures thereof; and
said second polymeric layer is composed of a polymeric foam material selected from the group consisting of ethylene vinyl acetate, polyethylene, polyurethane, and mixtures thereof.

18. An integral sound absorber and water deflector panel adapted to be positioned in a space defined between an inner wall and a passenger compartment door panel of an automotive vehicle door, the integral panel comprising:
a body member having a periphery and a central body region defined thereby the body member comprising:
a first polymeric layer composed of a water impervious polymeric film material, said first polymeric layer having a first face adapted to contact an interiorly oriented surface of the inner wall in essentially surface-to-face relationship, said first polymeric layer further having a second face opposed to said first face and separated from the first face by an essentially uniform thickness of said polymeric film material;
a second polymeric layer integrally connected to said second face of said first polymeric layer in continuous overlying relationship thereto, said second polymeric layer composed of a polymeric foam material, said second polymeric layer having an outer face opposed to said first inner wall contacting face of said first polymeric layer, said outer face adapted to directly contact at least a portion of an exteriorly oriented face of the passenger compartment door panel;
said first polymeric layer and said second polymeric layer collectively forming the central body region and at least one flange region; and
at least one contour defined in said first face of said polymeric layer in said central body region;
wherein said first polymeric layer has an essentially constant thickness and said second polymeric layer has a positionally variable thickness greater than said thickness of said first polymeric layer, said second polymeric layer thickness ranging from a thickness about 1 time greater than said first polymeric layer thickness to a thickness about 300 times greater than said first polymeric layer thickness.

19. The integral panel of claim 18 further comprising:
at least one bead disposed on and projecting outward from said first face of said first polymeric layer, wherein said first polymeric layer has an essentially uniform thickness throughout contours of said bead and said second polymeric layer fills interior contours of said bead; and
at least one opening defined in and extending through said first and second layers.

20. The integral panel of claim 19 wherein said second polymeric layer has a thickness between about 2 and about 50 times said thickness of said first polymeric layer in said region defined by said flange.

21. The integral panel of claim 20 wherein said first polymeric layer is composed of a polymeric film material selected from the group consisting of ethylene vinyl acetate, polyurethane, polyvinyl chloride, polyethylene and mixtures thereof; and said second polymeric layer is composed of a polymeric foam material selected from the group consisting of polyethylene, polyurethane, and mixtures thereof.

22. The integral panel of claim 1 wherein said first polymeric layer consists essentially of a polyurethane film material; and wherein said second polymeric layer consists essentially of a polyurethane foam material.

23. The integral panel of claim 18 wherein said first polymeric layer consists essentially of a polyurethane film material; and wherein said second polymeric layer consists essentially of a polyurethane foam material.

24. In a motor vehicle having a door, the door having an inner wall, a passenger compartment door panel and a space defined thereinbetween, the improvement comprising an integral sound absorber and water deflector panel positioned in the space, the integral panel comprising:
a body member having a periphery and a central body region defined thereby, the body member comprising:

a first polymeric layer composed of a water impervious polymeric film material, said first polymeric layer having a first face contacting an interiorly oriented surface of the inner wall in essentially parallel orientation thereto and an opposed second face, said first face and said second face being disposed from one another by an essentially uniform thickness of said polymeric film material;

a second polymeric layer integrally connected to said first polymeric layer in continuous overlying relationship thereto, said second polymeric layer composed of a polymeric foam material, said second layer having an outer face opposed to said first inner wall contacting face of said first polymeric layer, said outer face directly contacting at least a portion of an exteriorly oriented face of the passenger compartment door panel; and at least one contour defined in said first face of said first polymeric layer;

wherein said first polymeric layer has an essentially constant thickness, and said second polymeric layer has a positionally variable thickness over substantially the entire body member.

25. The motor vehicle of claim 24 wherein said first polymeric layer acts cooperatively with said second polymeric layer to minimize sound transmission through the integral panel.

26. The motor vehicle of claim 25 wherein the space has a width, and wherein the body member further comprises at least one region having a total panel thickness essentially equal to the width of the space defined between the inner wall and the passenger compartment door panel.

27. The motor vehicle of claim 25, further comprising a flange contiguously extending from said central body region along at least one edge of said integral panel, wherein said flange is composed of said first polymeric layer and said second polymeric layer, said second polymeric layer having a thickness in a range between about 1 and about 50 times said thickness of said first polymeric layer, and said second polymeric layer in said central body region has a thickness greater than said thickness in said flange region.

28. The motor vehicle of claim 27 wherein said thickness of said second polymeric layer in said central body region is between about 1 and about 300 times said thickness of said first polymeric layer.

29. The motor vehicle of claim 25, further comprising at least one cross slit extending through said first and second polymeric layers.

30. The motor vehicle of claim 29 wherein said thickness of said second polymeric layer proximate to said cross slit is in a range between about 1 and about 50 times said thickness of said first polymeric layer.

31. The motor vehicle of claim 29 wherein said cross slit is located in a depression defined in said second polymeric layer.

32. The motor vehicle of claim 25, further comprising:

at least one bead disposed on and projecting outward from said first face of said first polymeric layer, wherein said first polymeric layer uniformly corresponds to contours of said bead; and wherein said second polymeric layer fills said contours defined by said first polymeric layer; and at least one panel region extending between and defined by said bead.

33. The motor vehicle of claim 25, further comprising at least one contoured channel formed in and projecting inward from said first face of said first polymeric layer, said thickness of said first polymeric layer uniformly profiling said inwardly projecting contoured channel.

34. The motor vehicle of claim 33 wherein said surface of said second polymeric layer opposed to said contoured channel is essentially planar.

35. The motor vehicle of claim 33, further comprising at least one bead disposed in the passenger compartment door panel contacting face of said second polymeric layer.

36. The motor vehicle of claim 35 wherein said bead defined in said passenger compartment door panel contacting face corresponds locally with said contoured channel defined in said inner wall contacting face.

37. The motor vehicle of claim 25 wherein said passenger door contacting surface of said second polymeric layer has a higher coefficient of friction relative to said inner wall contacting surface.

38. The motor vehicle of claim 33 wherein said first polymeric layer is composed of a polymeric film material selected from the group consisting of polyurethane, polyvinyl chloride, polyethylene and mixtures thereof; and said second polymeric layer is composed of a polymeric foam material selected from the group consisting of ethylene vinyl acetate, polyethylene, polyurethane, and mixtures thereof.

39. The motor vehicle of claim 24 wherein said first polymeric layer consists essentially of a polyurethane film material; and wherein said second polymeric layer consists essentially of a polyurethane foam material.

* * * * *

UNITED STATES PATENT AND TRADEMARK OFFICE
CERTIFICATE OF CORRECTION

PATENT NO. : 6,197,403 B1
DATED : March 6, 2001
INVENTOR(S) : Steven G. Brown and Guy W. Boitos It is certified that error appears in the above-identified patent and that said Letters Patent is hereby corrected as shown below:

Column 7,
Line 53, after "10" insert -- . --.
Line 57, delete "50" and insert -- 40 --.
Line 60, delete "engaging 4" and insert -- engagingly --.

Column 11, claim 11,
Line 33, after ";" insert -- and --.

Column 12, claim 18,
Line 2, after "thereby" insert -- , --.

Signed and Sealed this

Twenty-sixth Day of February, 2002

*Attest:*

JAMES E. ROGAN
*Attesting Officer*  *Director of the United States Patent and Trademark Office*